Figure 1:
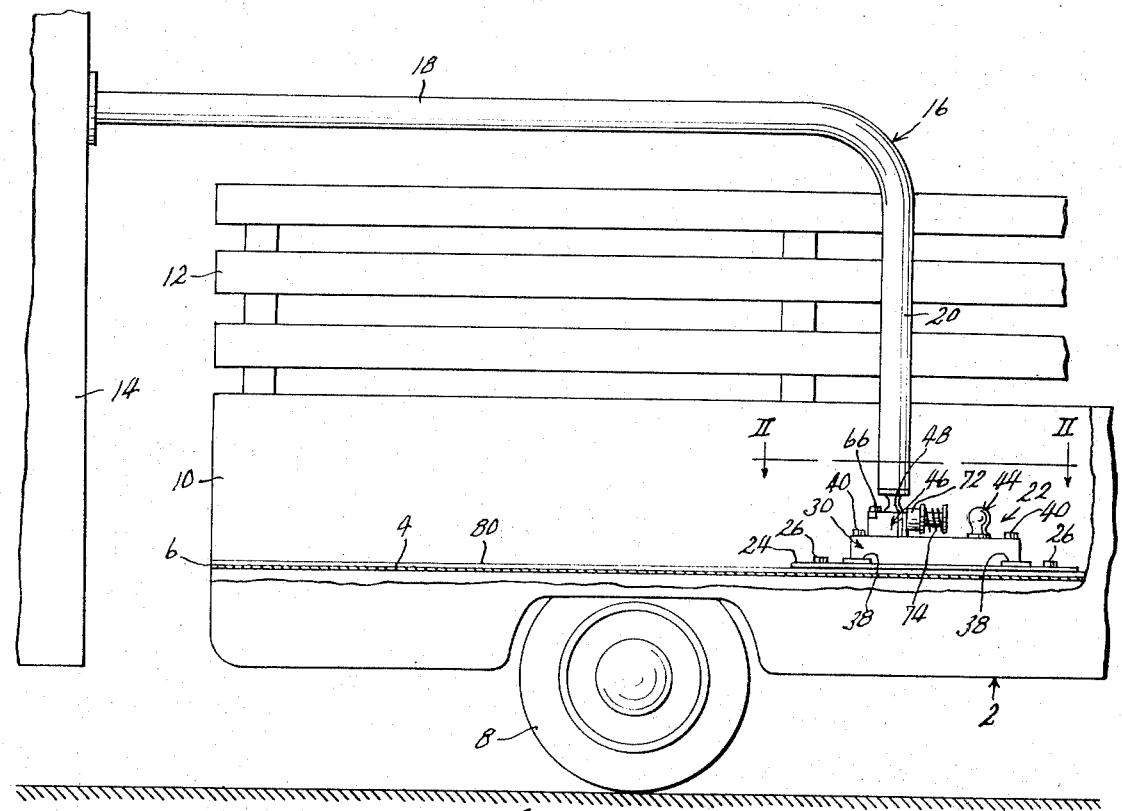

United States Patent [19]
Johannes

[11] 3,790,188
[45] Feb. 5, 1974

[54] GOOSENECK TRAILER HITCH FIXTURE FOR PICK-UP TRUCKS

[76] Inventor: John H. Johannes, Rt. 1, Robinson, Kans. 66532

[22] Filed: Mar. 27, 1972

[21] Appl. No.: 238,418

[52] U.S. Cl............................ 280/423, 280/415 A
[51] Int. Cl.............................................. B60d 1/00
[58] Field of Search.... 280/423, 405, 406, 407, 415

[56] References Cited
UNITED STATES PATENTS

| | | | |
|---|---|---|---|
| 3,336,051 | 8/1967 | Dale | 280/423 R |
| 2,911,233 | 11/1959 | Riddle | 280/415 A |
| 2,872,213 | 2/1959 | Hosford | 280/415 A |
| 2,393,016 | 1/1946 | Black | 280/423 B |

FOREIGN PATENTS OR APPLICATIONS

| | | | |
|---|---|---|---|
| 1,136,165 | 12/1956 | France | 280/415 A |

Primary Examiner—Leo Friaglia
Assistant Examiner—T. L. Siemens
Attorney, Agent, or Firm—John A. Hamilton

[57] ABSTRACT

A gooseneck trailer hitch fixture for pick-up trucks consisting of a mounting plate adapted to be secured to the floor of a pick-up truck bed, a carrier releasably affixed to the mounting plate, and a hitch ball and a hitch socket secured to the carrier in horizontally spaced apart relation for selective use with trailers equipped with either type of hitch element, the carrier being attachable to the mounting plate selectively in either of two positions to place either of the two hitch elements carried thereon in position for use.

2 Claims, 7 Drawing Figures

GOOSENECK TRAILER HITCH FIXTURE FOR PICK-UP TRUCKS

This invention relates to new and useful improvements in trailer hitch fixtures for use in connecting trailer type vehicles to towing automotive vehicles, and has particular reference to a hitch fixture for connecting trailers having gooseneck hitches to pick-up trucks.

Gooseneck trailer hitches for connecting trailers to pick-up trucks have come into rather wide usage. Such a hitch consists generally of a right-angled arm affixed at its rearward end to the trailer, and extending forwardly and then downwardly for attachment, by the usual ball-and-socket hitch, to the floor of the truck at a point well forward from the rearward edge of the truck bed, and in fact well forward of the rear axle of the truck itself. Such a hitch has certain distinct advantages over hitches wherein the hitch ball-and-socket is disposed at the extreme rearward end of the towing vehicle. Since the hitch point is permitted by the gooseneck connection to be disposed approximately at the vertical turning axis of the towing vehicle, there is provided a more accurate, efficient towing action, with less tendency for the trailer to "whip" from side to side. The gooseneck also provides a better "cornering" action when the towing vehicle is turned, for the same reason. So long as the vertical leg of the hitch arm is sufficient to elevate its horizontal leg above the side walls of the truck bed, and the horizontal leg is of sufficient length to prevent interference between the trailer and the rear corners of the truck bed, an extreme turning angle is made possible, permitting the towing vehicle to be turned at right angles to the trailer. This is important to improved maneuverability in tight quarters. Furthermore, this extreme turning angle is possible with the trailer spaced quite closely behind the truck, thereby decreasing the overall length of the truck-trailer combination. For reasons involving a combination of all of these factors, gooseneck hitches are generally proportioned to require that the hitch point be disposed at a point 6 feet forward from the rear edge of the truck bed, and this dimension must be closely adhered to.

However, the gooseneck trailer hitch concept has also been subject to certain problems. The hitch fixture to be mounted in the truck bed has generally required cutting, boring, welding, or other modification of the truck bed itself for the mounting thereof, which of course may weaken or otherwise impair the truck bed for its normal use as a load-carrying implement, and reduce the trade-in value of the truck. Also, the fixture, when permanently installed, projects upwardly into the truck bed interior and forms an obstruction on the floor thereof, and thereby impairs the utility of the bed for carrying normal loads. Also, the gooseneck hitch arms mounted on trailers may be equipped with either the ball element or the socket element of a ball-and-socket hitch, and heretofore this has required that each truck be equipped with a ball or socket element so as to mate with each particular trailer, and if a truck owner had trailers of both types, he had to change the hitch fixture of the truck to switch from one trailer to the other.

Accordingly, the principal object of the present invention is the provision of a gooseneck trailer hitch fixture which solves all of the above enumerated problems in a very simple manner. It may be mounted in virtually any pick-up truck bed without requiring any permanent change or adaptation whatsoever of the truck bed. All elements thereof projecting materially above the truck bed floor are mounted on a carrier which may easily be detached so as not to obstruct the load space of the truck bed to any appreciable degree. The carrier has both ball and socket hitch elements for connection to gooseneck hitch arms having either type of hitch element, and the carrier may be mounted in either of two positions to place the desired hitch element thereof at the proper spacing from the rearward edge of the truck bed.

Other objects are simplicity and economy of construction, and efficiency and dependability of operation.

Figure 2:
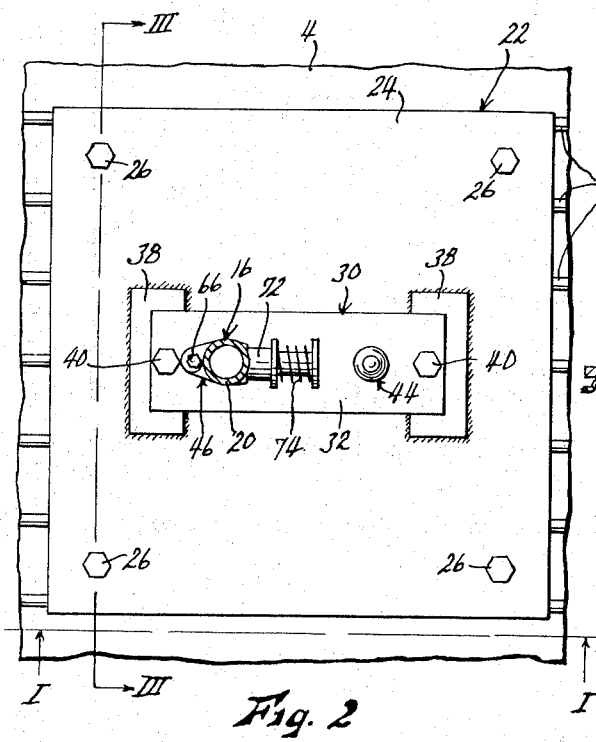
Figure 3:
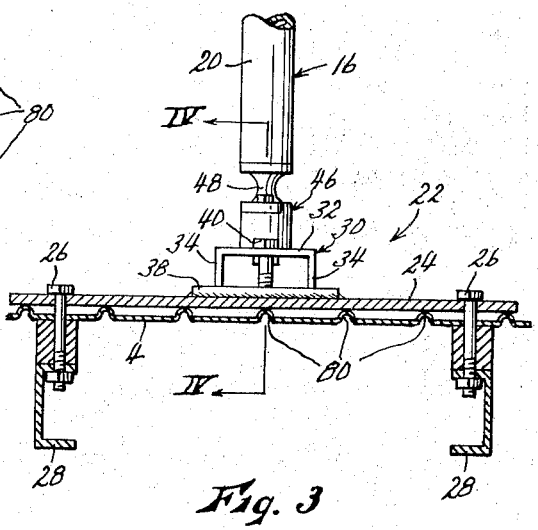
Figure 4:
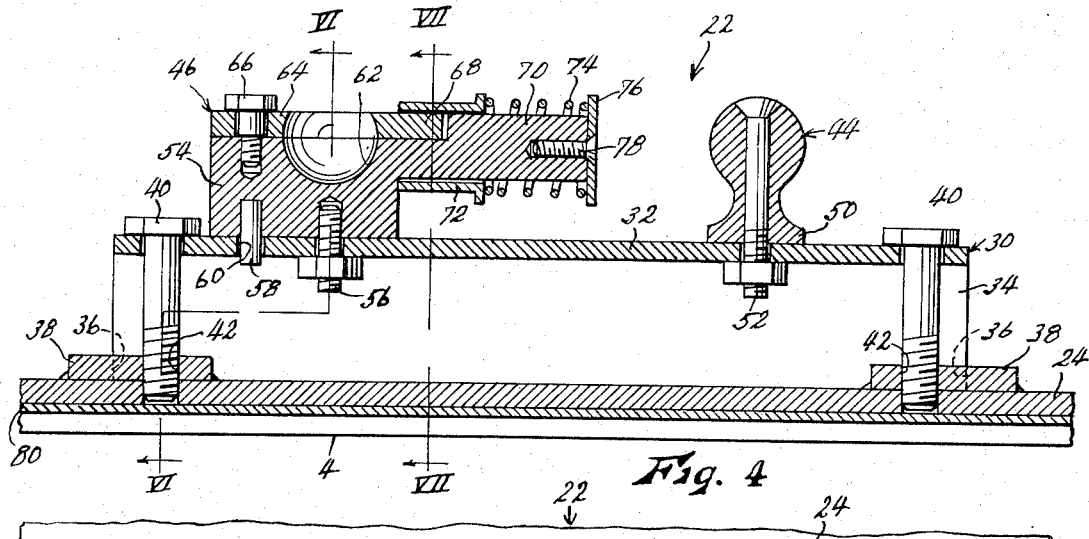
Figure 5:
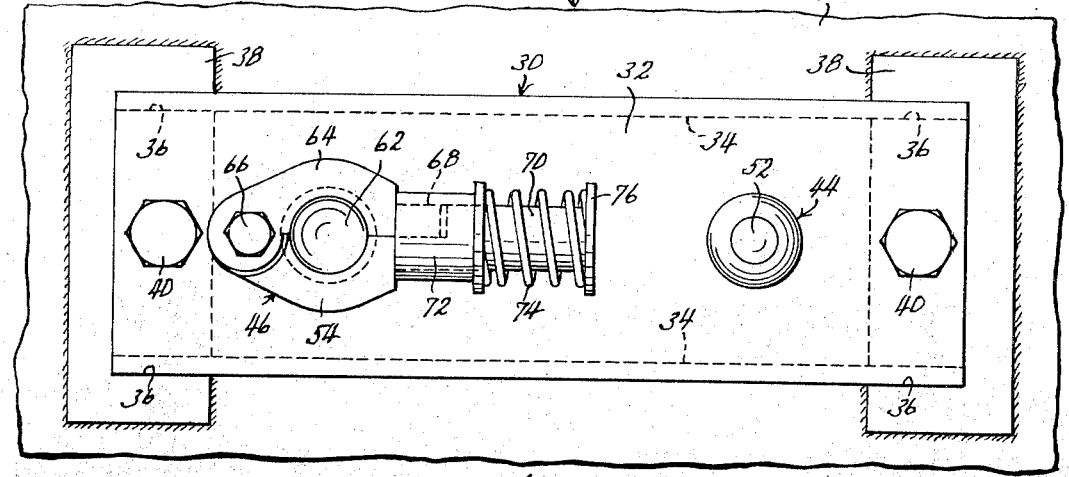
Figure 6:
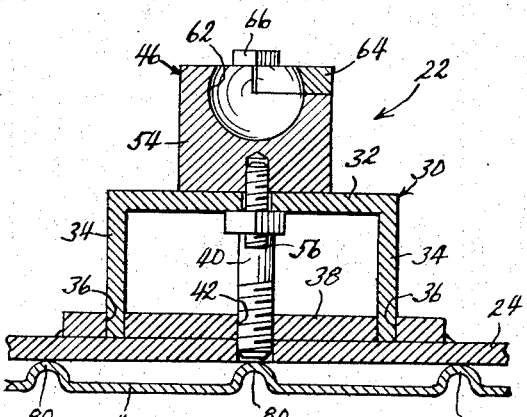
Figure 7:
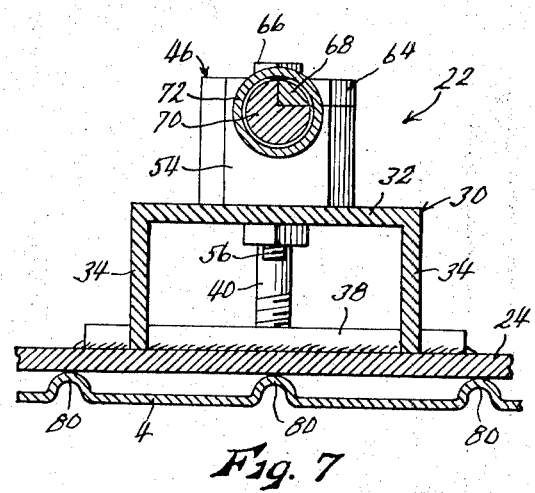

With these objects in view, as well as other objects which will appear in the course of the specification, reference will be had to the accompanying drawing, wherein:

FIG. 1 is a fragmentary longitudinal sectional view of the bed of a pick-up truck, taken on line I—I of FIG. 2, showing a gooseneck trailer hitch fixture embodying the present invention mounted operatively therein, FIG. 2 is an enlarged fragmentary sectional view taken on line II—II of FIG. 1, FIG. 3 is a fragmentary sectional view taken on line III—III of FIG. 2, FIG. 4 is an enlarged, fragmentary sectional view taken on line IV—IV of FIG. 3, with gooseneck hitch arm omitted, FIG. 5 is a fragmentary top plan view of the parts shown in FIG. 4, FIG. 6 is a fragmentary sectional view taken on line VI—VI of FIG. 4, and FIG. 7 is a fragmentary sectional view taken on line VII—VII of FIG. 4.

Like reference numerals apply to similar parts throughout the several views, and the numeral 2 applies generally to a pick-up truck, shown fragmentarily, with the floor of the bed thereof being indicated at 4 with its rearward edge indicated at 6, and its rear wheels at 8. One of the bed side walls is indicated at 10, and said side walls may be extended upwardly by slatted stake walls 12. A trailer to be towed is indicated generally at 14, and has affixed to its forward end a gooseneck hitch arm 16 which has a forwardly extending horizontal leg 18 which projects forwardly over truck bed 4, and a downwardly extending vertical leg 20 which is adapted to be secured at its lower end to truck bed 4 by a hitch fixture forming the subject matter of the present invention and indicated generally by the numeral 22.

Hitch fixture 22 includes a square mounting plate 24 of heavy steel overlying truck bed floor 4, and secured by a bolt 26 at each of its four corners. Bolts 26 extend through floor 4 and engage in the chassis side rails 28 forming the main frame of the truck, as shown in FIG. 3. Said bolts may constitute selected bolts of those already used to secure the truck bed to the truck frame, or at least may utilize holes formed for receiving said bed-mounting bolts.

Releasably attached to the upper surface of said mounting plate is a heavy steel carrier 30 constituting a U-shaped channel, inverted so that its web 32 is uppermost, and the lower edges of its flanges 34 rest on plate 24. Carrier channel 30 is arranged with its midline extending along the midline of the truck bed, and the respective forward and rearward end portions of its flanges 34 engage slidably in notches 36 formed therefor in a pair of plates 38 welded to the upper surface of plate 24, respectively at the opposite ends of the carrier channel. The carrier channel is releasably secured in place by a pair of screws 40 extending through web 32 respectively at opposite ends of the channel, and threaded into tapped holes 42 provided therefor in plates 24 and 38 (see FIGS. 4 and 6). The engagement of channel flanges 34 in notches 36 secures the carrier channel rigidly against horizontal movement in any direction, so that screws 40 are not subject to transverse bending stresses.

Mounted on carrier channel web 32, at spaced apart points along the midline thereof, are the ball member 44 and the socket member 46 of a standard ball-and-socket hitch device. Members 44 and 46 do not, however, cooperate with each other, but with mating hitch members carried by gooseneck arm 16 at the lower end thereof. For example, as shown arm 16 is provided with a ball member 48 adapted to be operatively engaged in socket member 46, but it will be understood that in some cases the hitch arm is fitted with a socket member, not shown, corresponding to socket member 46, which would be operatively engaged on ball member 44.

Ball member 44 is simply a spherically shaped member having a pedastal base 50 engaging web 32 of carrier 30, and affixed to said web by a bolt 52. Socket member 46 comprises a block 54 secured to web 32 by a stud bolt 56 and prevented from rotating on said bolt by a vertical pin 58 fixed in the block and projecting downwardly through a hole 60 provided therefor in web 32. Formed in the top of block 54 is a hollow spherical socket 62 adapted to receive ball member 48 therein, said socket being truncated at its top, but being of greater than hemispherical extent to retain said ball member therein. The top portion of the socket, at one side thereof, is formed by an arm 64 pivoted to block 54 by a vertical screw 66, which permits the arm to be pivoted outwardly to open socket 62 to receive ball member 48, and to be pivoted inwardly to close the socket and secure said ball member in the socket. Arm 64 includes a finger 68 which, when the arm is pivoted to close the socket, lies along a neck 70 of block 54 which projects radially of socket 62, and a collar 72 slidable on said neck encircles both the neck and finger 68 to lock the socket member closed. Said collar is slidably retractable along said neck to release finger 68 and unlock the socket, but is resiliently biased to its locking position by a coil spring 74 mounted on neck 70 and compressed between said collar and a disc 76 affixed to the extended end of said neck by a screw 78. The specific socket member 46 shown is not particularly pertinent to the present invention, any of several different constructions being usable, the only requirement being that it be capable of receiving a ball member 48 operatively therein. Ball member 44 and socket 62 of socket member 46 are of course spaced apart horizontally, and are centered at equal distances from the forward and rearward ends of carrier channel 30. Screws 40 are also disposed equidistantly from the ends of the carrier channel.

In use, the hitch fixture 22 is mounted on floor 4 of the truck bed, in such a position that the midline of carrier channel 30 is disposed at the midline of the truck bed, by securing mounting plate 24 with the four bolts 26. These bolts may constitute pre-existing bed bolts already used to affix the truck bed to chassis side rails 28, or, if longer bolts are required, they may be inserted in holes provided by the removal of pre-existing bed bolts. Thus the fixture is mounted without any cutting, welding, or modification of the truck bed whatsoever, and also may be removed leaving no trace of its former presence. Most pick-up truck bed floors 4 are provided with upstanding ribs 80, to facilitate the movement of cargo thereon, with the pre-existing bed bolts disposed between said ribs. Said ribs support mounting plate 24, so that it can bridge the upstanding heads of any bed bolts thereunder.

During periods the trailer hitch is not to be used, carrier channel 30, together with the hitch members 44 and 46 supported thereby, are detached from mounting plate 24 by removing the two screws 40, leaving only mounting plate 24, and the notched plates 38 welded thereto, permanently mounted in the truck bed. These plates 24 and 38 project upwardly from the truck bed 4 only slightly, and do not appreciably obstruct the cargo space, nor otherwise impair the efficiency of the truck bed in its primary functions.

When it is desired to use the hitch, it is first determined whether the gooseneck arm 16 of the trailer 14 to be towed is equipped with a ball member 48 engageable in socket member 46, or a socket member engageable with ball member 44, and carrier channel 30 is inserted in notches 42 of plates 38 and secured by screws 44, reversing said channel end-for-end if necessary, to dispose the hitch member 44 or 46 to be used closest to the rearward end of the truck bed. As previously discussed, the spacing of the used hitch member 44 or 46 from the rearward end of the truck bed is rather critical and must be closely maintained, a spacing of six feet usually being specified. The reversibility of carrier channel 30 permits either the ball member or the socket member, as required, to be disposed selectively in the use position. The ball and socket members 44 and 46, being secured to carrier 30 only by bolts 52 and 56 respectively, may easily be interchanged for members having balls and sockets of different diameters, as required. Diameters of 1½ to 2½ inches are commonly used. Although not shown, and not an intrinsic part of the present invention, it will be understood that vertical leg 20 of gooseneck arm 16 is usually adjustable in length, to permit levelling of trailer 14.

While I have shown and described a specific embodiment of my invention, it will be readily apparent that many minor changes of structure and operation could be made without departing from the spirit of the invention.

What I claim as new and desire to protect by Letters Patent is:

1. A gooseneck trailer hitch fixture for a pick-up truck comprising:
   a. a carrier,
   b. means operable to mount said carrier on the floor of the bed of a pick-up truck in forwardly spaced relation from the rearward edge thereof, said mounting means comprising a planar mounting plate adapted to lie flat on the floor of said truck bed and to be secured thereto, said carrier resting on the upper surface of said mounting plate and extending thereabove,
   c. a ball member and a socket member of a ball-and-socket hitch device mounted on said carrier in horizontally spaced relation and operable to cooperate selectively with a corresponding hitch socket member or a hitch ball member mounted on the gooseneck hitch arm of a trailer, with said hitch members projecting above said carrier, and d. screws extending downwardly through said carrier and threaded in said mounting plate, whereby by removal of said screws, said carrier may be detached from said mounting plate.

2. A trailer hitch member as recited in claim 1 wherein said carrier comprises an elongated channel member with its web disposed uppermost and its flanges engaging the upper surface of said mounting plate, said ball and socket hitch members being affixed to the web of said carrier channel respectively at equal distances from the opposite ends thereof, and with the addition of plates affixed to the top surface of said mounting plate and having notches formed therein for receiving the flanges of said carrier channel vertically therein, whereby said carrier is secured against horizontal movement, said screws normally securing said carrier channel flanges against upward removal from the notches of said notched plates, and whereby, by removal of said screws, said carrier channel may be reversed to bring either one of said hitch members selectively into a pre-determined position relative to said truck bed.

* * * * *